US006467055B1

United States Patent
Katuszonek (10) Patent No.: US 6,467,055 B1
(45) Date of Patent: Oct. 15, 2002

(54) TEST SYSTEM FOR USE WITH A COMMUNICATIONS NETWORK, AND APPARATUS AND METHOD FOR TESTING DIGITAL DATA TRANSFER WITHIN A COMMUNICATIONS NETWORK

(75) Inventor: Mark A. Katuszonek, Antelope, CA (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/427,782

(22) Filed: Oct. 27, 1999

(51) Int. Cl.[7] .............................. G06F 11/00; H04L 1/22
(52) U.S. Cl. .......................................... 714/43; 370/241
(58) Field of Search ............................ 714/43, 44, 46, 714/48, 56, 25, 27, 32; 370/241, 242, 252, 254

(56) References Cited

U.S. PATENT DOCUMENTS

| 4,791,666 A | | 12/1988 | Cobb et al. | |
|---|---|---|---|---|
| 4,998,240 A | * | 3/1991 | Williams | 370/17 |
| 5,189,663 A | * | 2/1993 | Williams | 370/17 |
| 5,809,108 A | * | 9/1998 | Thompson et al. | 379/15 |
| 5,953,318 A | | 9/1999 | Nattkemper et al. | |
| 5,982,851 A | * | 11/1999 | Kennedy et al. | 379/21 |
| 6,079,036 A | * | 6/2000 | Moharram | 714/712 |
| 6,389,281 B1 | * | 5/2002 | Lee | 455/423 |
| 6,396,812 B1 | * | 5/2002 | Glass, III | 370/252 |

* cited by examiner

Primary Examiner—Nadeem Iqbal (57) ABSTRACT

A test system is provided for use with a communications network having a plurality of switches and trunks. The test system includes test circuitry, a test interface, and a test set. The test circuitry is operative to test the transmission of digital data over a selected network trunk. The test interface communicates with the test circuitry and is operative to connect the test circuitry with the selected network trunk. The test set communicates with the test circuitry and the test interface. The test set is operative to selectively connect to the network switches via the test interface. The test set includes processing circuitry, memory and a switching application program. The processor executes the application program to route a digital data call via a switch from the selected network trunk to another network trunk, and to specify a terminating circuit used to terminate the digital data call via the switch where the call is thereafter delivered. The test circuitry implements testing of the selected trunk. A method is also provided.

22 Claims, 5 Drawing Sheets

TEST SYSTEM FOR USE WITH A COMMUNICATIONS NETWORK, AND APPARATUS AND METHOD FOR TESTING DIGITAL DATA TRANSFER WITHIN A COMMUNICATIONS NETWORK

TECHNICAL FIELD

The present invention pertains to a telecommunications test system that generates and executes test process capabilities. More particularly, the present invention relates to test systems that implement a test process for digital data services that speeds up the isolation process when identifying network trunks that have a degraded or non-existent capability to transmit digital data.

BACKGROUND OF THE INVENTION

Present testing strategies for digital data services amount to "hit and miss" testing that proves to be relatively slow and involves a significant amount of technician test hours in order to implement troubleshooting of customer complaints. For example, test technicians have long used telephone test sets comprising a telephone handset having internal electronics designed to test telephone circuits.

Automated test capabilities for testing switched voice services have existed for many years. However, such automated test capabilities have never been expanded to the field of digital data services in a manner that is consistent with many digital products.

Presently, if a problem is reported to a telecommunications provider by a customer involving a wide band call, a craftsperson at the telecommunications provider has to test each circuit involved in the call one circuit at a time. Because there is no way to directly select the desired circuits, these circuits have to be manually busied, or filtered, out until only the desired circuit remains. However, such endeavor requires a significant amount of time and causes a loss of service that is particularly evident when a wide band call is being tested.

In order to monitor a primary rate interface (PRI) signaling link with present techniques, test equipment has to be moved around and connected directly to the circuit that needs to be monitored. However, this consumes time. Furthermore, implementation of this technique can result in errors.

Accordingly, there exists a need for improved testing of digital data transfer through trunks within a network environment.

SUMMARY OF THE INVENTION

The present invention is directed towards an automated test system and method having a test process capability that enables a local or remote tester to reduce the amount of time that is required to find and fix digital data transmission facilities that are in trouble. A tester is able to direct a network switch to connect to a specific outgoing trunk in order to perform testing.

According to one aspect, a test system is provided for use with a communications network having a plurality of switches and trunks. The test system includes test circuitry, a test interface, and a test set. The test circuitry is operative to test the transmission of digital data over a selected network trunk. The test interface communicates with the test circuitry and is operative to connect the test circuitry with the selected network trunk. The test set communicates with the test circuitry and the test interface. The test set is operative to selectively connect to the network switches via the test interface. The test set includes processing circuitry, memory and a switching application program. The processor executes the application program to route a digital data call via a switch from the selected network trunk to another network trunk, and to specify a terminating circuit used to terminate the digital data call via the switch where the call is thereafter delivered. The test circuitry implements testing of the selected trunk.

According to another aspect, an apparatus is provided for testing digital data transfer within a communications network having a plurality of switches and trunks. The apparatus includes an interface and a test set. The interface is configured to couple with a selected network trunk. The test set includes test circuitry, processing circuitry, memory and a switching application program. The test circuitry is configured to test digital data transmission over the selected network trunk. The test set is operative to selectively connect with the network switches via the test interface. The processor executes the application program to transfer a digital data call with a switch from the selected network trunk to another network trunk having a terminating circuit used to terminate the digital data call via the switch where the call is thereafter delivered. The test circuitry implements testing of the selected trunk.

According to yet another aspect, a method is provided for testing network trunks within a network having a plurality of switches and trunks. The method includes the steps of: providing a test interface and a test set, the test set including test circuitry, processing circuitry, memory and a switching application program operative to route digital data calls over the network; identifying a selected network trunk via the test set; selectively connecting to the selected network trunk with an associated switch via the test interface; executing the application program to route a digital data call via the switches from the selected network trunk to a terminating circuit on another network trunk to transfer the digital data call over to the another network trunk where the call is delivered to the another network trunk; and testing the selected network trunk with the test circuitry to identify a degraded capability to transmit digital data over the selected network trunk.

One advantage is provided by the ability to eliminate "hit and miss" testing strategies by enabling direct select digital data testing and automated digital data testing over network trunks.

DETAILED DESCRIPTION OF THE PREFERRED EMBODIMENTS

The present invention is directed towards a telecommunications test system that is able to relatively quickly identify network trunks that are unable, or have a reduced capability, to transmit digital data such as video, internet data, etc. Accordingly, test process capabilities are provided in a test system that enables quick identification of facilities that are in trouble, and in combination with field technicians, enables the fixing of such identified facilities. According to one implementation, the test system is an automated test system.

Figure 1:
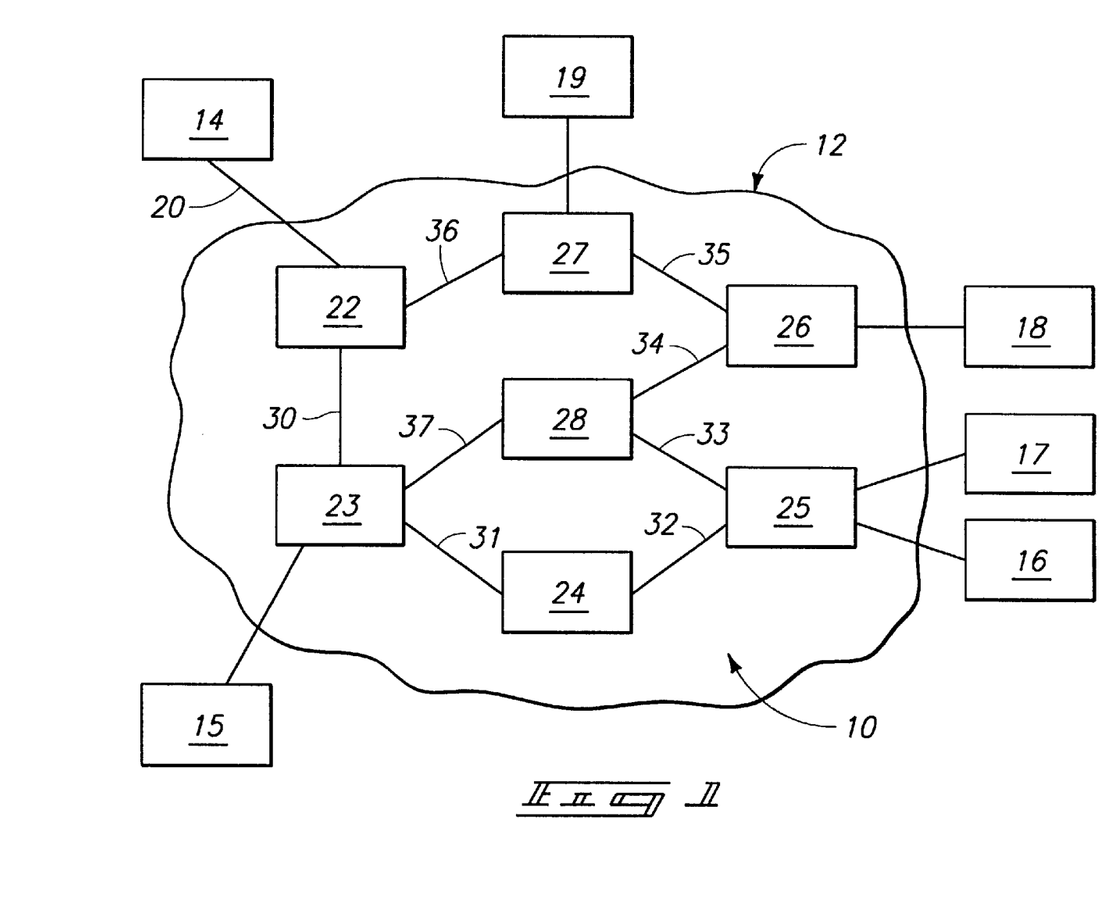
FIG. 1 is a schematic block diagram illustrating the architecture of a telecommunications network capable of benefiting from the test system of Applicant's invention which is described in greater detail with reference to FIGS. 2–5.

FIG. 1 is a schematic block diagram depicting one embodiment of the present invention in the form of a test system identified by reference numeral 10. Test system 10 is incorporated into a telecommunications network 12 comprising subscribers 14–19, at least one subscriber loop 20, switching exchanges (or switches) 22–28, and trunks 30–37. Subscribers 14–19 each form an end device for communicating over network 12, and are referred to as stations, or end stations. Examples of stations include computers, terminals, telephones, or other communicating devices. Switches 22–28 are referred to as communication network nodes. In operation, switches 22–28 are responsible for routing and switching traffic between subscribers, or end offices, 14–19.

Figure 2:
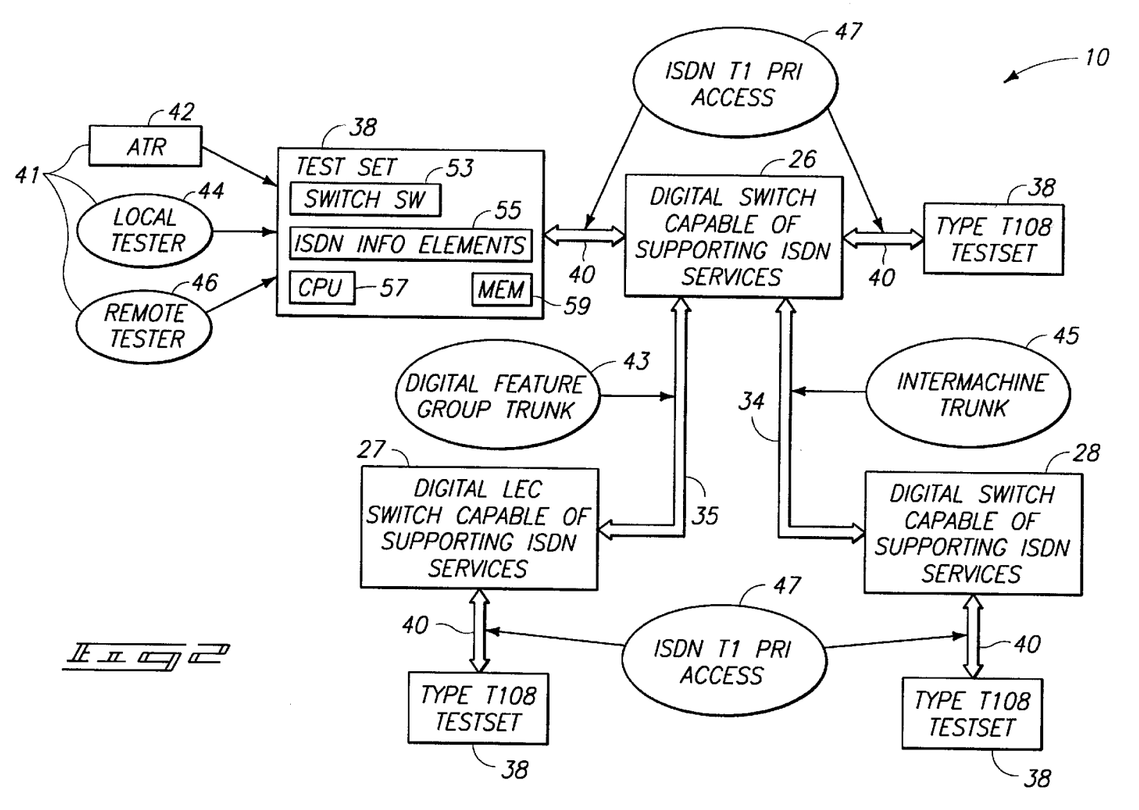
FIG. 2 is a block diagram illustrating a test system for testing digital data by connecting a network switch to a specific outgoing trunk for test purposes according to one aspect of the invention.

FIG. 2 is a schematic block diagram further illustrating one construction for test system 10 which can be used to test and identify trunks 30–37 within network 12 (of FIG. 1). For purposes of this disclosure, it is understood that "trunk" refers to a communication line formed between two switching systems such as central office equipment for a telephone company and private branch exchanges (PBXs). As shown in FIG. 1, trunks 30–37 are formed between switches 22–28. It is understood that trunks 30–37 can take the form of digital feature group trunks 43 or inter-machine trunks 45, as shown in FIG. 2.

More particularly, a type 108 (T108) test set 38 is connected with each of switches 26–28 of FIG. 2 via an ISDN T1 PRI access link 40 that comprises a primary rate interface (PRI) trunk. One exemplary test set 38 is a TSI1569 Digital Loopback Test Line, sold by Telesync, Inc. of Norcross, Ga., and configured to meet ANSI T1.206-1988 Digital Circuit Loopback Test (108) Line for Digital Exchanges and PBXs. Similarly, type 108 (T108) test lines 58 and 60 comprise test lines that are compatible with ANSI T1.206-1988 Digital Circuit Loopback Test (108) Line for Digital Exchanges and PBXs.

As shown in FIG. 2, an ISDN T1 PRI access link 40 is provided between each test set 38 and switch 26–28, respectively. ISDN refers to an integrated services digital network, and ISDN PRI forms one version of ISDN that is designed for telephone switches, computer telephony, and voice processing systems. Access link 40 comprises a data bus (not shown) and a primary rate interface (PRI) which is formed over the data bus, which is the ISDN equivalent of a T-1 circuit, and which is referred to herein as an ISDN T1 PRI 47.

The term "test set" as used to identify test set 38 refers to a communications device that includes electronics designed to test telecommunications circuits. In the past, the term referred to telephone handsets that contained extra electronics designed to test telephone circuits, and were often referred to as butt sets since they enabled a test technician to "butt in" to a conversation via a transmission line in order to listen to its quality.

As shown in FIG. 2, test set 38 includes switching software 53, ISDN information elements (IE) 55, a central processing unit (CPU) 57, and memory 59. Details of switching software 53 are described below in greater detail with reference to FIG. 5. Details of ISDN information elements (IE) 55 are provided below in greater detail with reference to Table 1. CPU 57 comprises processing circuitry that performs data manipulations. Memory 59 is utilized to store data, and in combination with CPU 57, coordinates the processing and storing of data, particularly when implementing switching software 53.

A user interface 41 communicates with test set 38 to enable the identification of trunks (for example, trunks 34–35) that have data transmission problems. For example, test set 38 enables isolation and identification of trunks that are unable to transmit digital data, or have a reduce capability to transmit digital data such as video data, internet data, and other types of digital data. User interface 41 can be implemented in several different forms including as an automated test routining (ATR) device 42, a local tester 44, and a remote tester 46.

As depicted in FIG. 2, trunks 34 and 35 (as well as trunks 30–38 of FIG. 1) can take the form of a digital feature group trunk 43 or an inter-machine trunk 45. Additionally, digital switch 25 in one implementation takes the form of a local exchange carrier (LEC) switch, whereas switches 26 and 28 are provided for use in long distance environments.

Test system 10. provides a capability to more quickly isolate network trunks that cause an inability or reduced capability to transmit digital data. According to one implementation, test system 10 provides a capability to provide a remote test system that has a recurring capability for implementing existing automated test processes, such as automated test routining (ATR) 42. ATR 42 enables testing and identification of degraded or failed facilities.

According to another implementation, test system 10 allows a tester to direct a selected network switch 26–28 to connect to a specific outgoing trunk 34 or 35 in order to test such trunk. A tester can direct such connection either locally or remotely via local tester 44 or remote tester 46, respectively, to direct a selected network switch 26, 27 or 28 to connect to a specific outgoing trunk 34 or 35 for the purpose of carrying out testing of data transfer on such trunk.

In contrast, prior art test systems only provide a method for placing test calls repeatedly over a network. A tester then waited for a specific switch to connect the tester to a suspected trunk in order to test and analyze the trunk. Accordingly, features of Applicant's invention are a vast improvement over such prior art, and prove even more timely and efficient.

In operation, a user accesses test set 38 via one of user interfaces 41, while test set 38 is connected to digital switch 24 via ISDN T1 PRI interface, or access link, 40. PRI interface 40 comprises a PRI trunk. Switch software 49, described below in greater detail with reference to FIG. 5, cooperates with ISDN information elements 55, which are also described below in greater detail with reference to Table 1, in order to enable a tester to control call routing. Additionally, switch software 49 and elements 55 cooperate to enable a tester to terminate a digital data call over a specific one of trunks 34 or 35 to another switch 27 or 28. The call is then transferred and later terminated via switch 27 or 28 at a standard test line, such as a standard test line that is available presently at all ISDN switches.

According to one implementation, test system 10 can be used to perform demand testing by field technicians using local tester 44. Alternatively, automated test system 10 can be utilized to perform demand testing by remote testers via remote tester 46. Further alternatively, test system 10 can be used to perform demand testing by support organizations such as an external support group. Even furthermore, test system 10 comprises an automated test system that can be used to implement automated 64 Kbps data testing. According to one implementation, trunk 34 comprises an intermachine trunk 45, whereas trunk 35 comprises a digital feature group trunk 43.

The ability to provide direct select digital data testing and automated digital data testing was not available via prior art techniques. Test system 10 of FIG. 2 provides such direct select digital data testing via testers 44 and 46 (of FIG. 2), and automated digital data testing capabilities via ATR 42 (of FIG. 2). In contrast, prior art techniques used voice testing strategies that are not always capable of detecting an inability or reduced capability to transmit digital data over a trunk.

The automated test system 10 of Applicant's invention provides more timely and reduced manpower-intensive techniques which replace such prior art techniques. Accordingly, automated test system 10 uses digital data testing techniques in order to isolate digital data performance issues in a more timely manner while utilizing fewer personnel resources (i.e. fewer man-hours required from personnel). The alternative prior art techniques comprise "hit and miss" testing strategies, with Applicant's test system 10 providing quicker processing which saves many technician test hours that are otherwise allocated when implementing prior art techniques during troubleshooting of customer complaints.

Accordingly, the implementation of automated test system 10 provides the ability to originate wide band test calls from a PRI trunk, such as trunks 34 or 35. Information is provided via a SETUP message that specifies which terminating circuits are to be used. An automated test routing (ATR) trunk group parameter is added to PRI trunks. Furthermore, an ability is provided to connect a D channel of a PRI trunk to a monitor port which will be connected to external test equipment that is then used to monitor message flow on a link.

Automated test system 10 of FIG. 2 includes the ability to conduct 64 Kbps bit error rate testing (BERT) which comprises testing that can verify the integrity of circuits within a network, such as network 12 of FIG. 1. System 10 also includes the ability to test circuits that are involved in wide band calls. Furthermore, automated test system 10 uses out-of-band signaling, which makes it possible to set up calls much more quickly than with existing automated test routining (ATR) systems, since existing ATR systems use in-band signaling. This feature becomes particularly significant when testing relatively large numbers of circuits.

Figure 3:
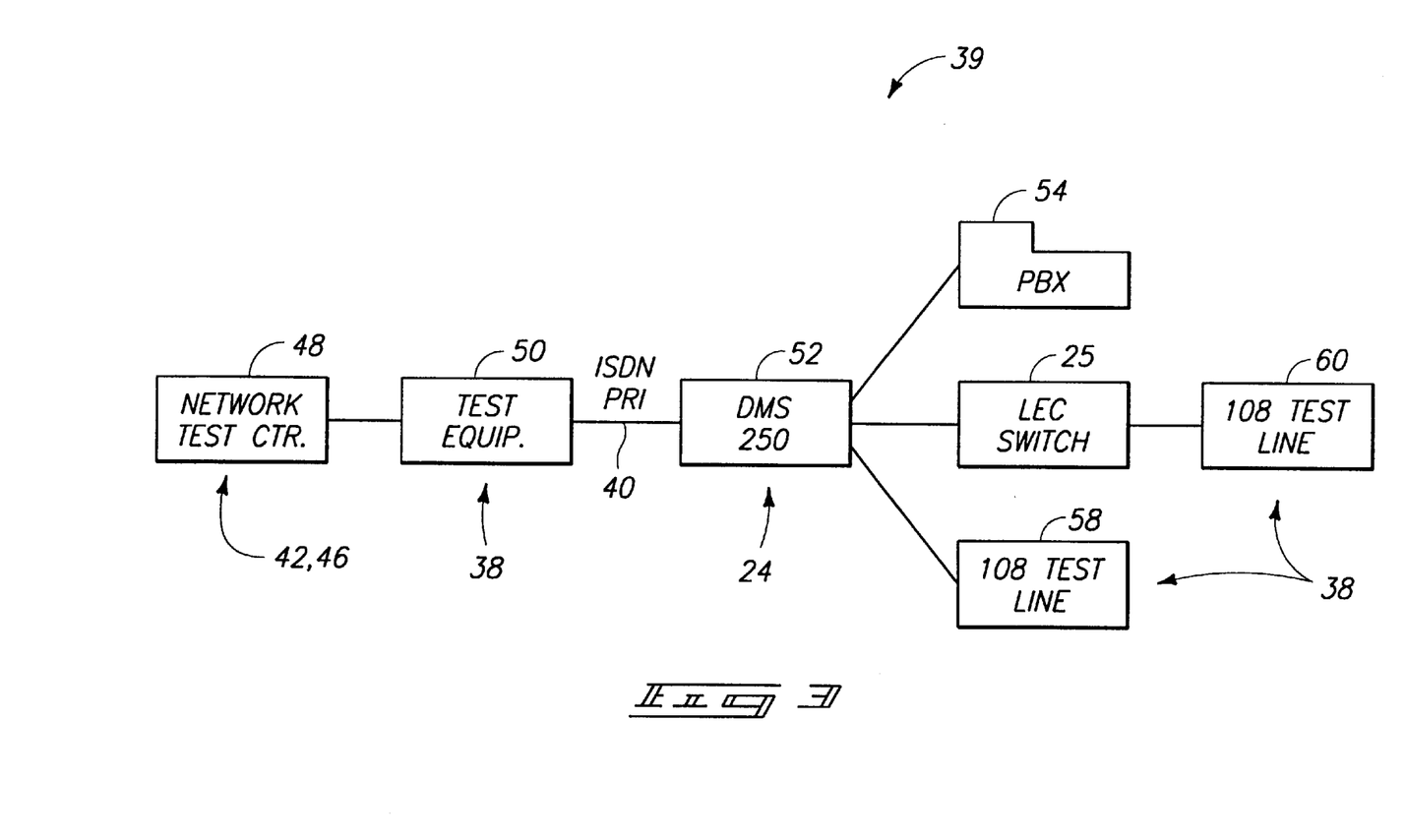
FIG. 3 is a block diagram illustrating a wide band automated test routining (ATR) network schematic block diagram.

FIG. 3 shows in block diagram form one implementation of an automated test routing (ATR) network for use within an automated test system that is provided by test system 10 of FIG. 2 when using ATR 42. More particularly, ATR network 39 of FIG. 3 illustrates how ATR 42 is used in system 10 (of FIG. 2). ATR network 39 of FIG. 3 includes a network test center 48, test equipment 50, ISDN PRI 40, a digital multiplex system ("DMS-250") 52, a private branch exchange (PBX) 54, a local exchange carrier (LEC) switch 25, T108 test line 58, and T108 test line 60. Network test center 48 can be provided by ATR 42 or remote tester 46. Test equipment 50 is provided by test set 38. "DMS-250" 52 is a digital switch provided by switch 26. T108 test lines 58 and 60 are provided by test set 38.

As shown in FIG. 3, ATR network 39 provides the ATR functionality of ATR 42 (of FIG. 2). Such functionality requires the provision of external test equipment 50. Equipment 50 is configured to interface with "DMS-250" 52 via PRI interface 40. Equipment 50 is used to generate a call and then run a BERT, or bit error rate test, over the resulting connection.

Network test center 48 comprises equipment that is configured to detect and diagnose faults and problems with communications lines and equipment attached thereto. Network test center 48 is also referred to as a network control center which, when centralized, provides a facility where a technician or network manager can access almost any circuit within a network in order to run diagnostic testing.

Test equipment 50 comprises equipment needed to test outgoing trunks within a network to determine digital data transfer performance characteristics. According to one implementation, test equipment 50 comprises test set 38 (of FIG. 2).

ISDN T1 PRI 40 is an enhanced T-1, or trunk level 1, which is a digital transmission link that is recognized as a standard for digital transmission in North America. ISDN T1 PRI 40 comprises a PRI trunk that provides a format having the benefit of providing extra bandwidth and richer and much faster out-of-band signaling.

Digital multiplex system ("DMS-250") 52 is one instance of a digital switch 26 comprising a digital central office, or public exchange, manufactured by Northern Telecom Limited, or Nortel Networks Corporation, of Brampton, Ontario, Canada. Such public exchange is typically referred to as a local telephone switch in the United States. Additional details of Nortel switching device "DMS-250" are available at Nortel Networks Corporation's website, www.nortelnetworks.com.

Private branch exchange (PBX) 54 is a smaller version of a telephone company's larger central switching office which the user owns, instead of the telecommunications provider. PBX 54 is a digital system that, in some cases, has an open architecture.

Local exchange carrier (LEC) switch 27 is a switch that is provided within a local exchange carrier (LEC), such as a local telephone company.

Automated test system 10 includes two major functional components comprising an automated test routining (ATR) network 39, described with reference to FIG. 3, and a digital test access (DTA) 62, as described below in greater detail with reference to FIG. 4.

As shown in FIG. 3, ATR network 39 cooperates to provide ATR 42 (of FIG. 2). Wide band ATR 42 will provide the ability to originate narrow or wide band data calls from a primary rate interface (PRI) trunk, such as trunks 34 or 35.

A SETUP message contains information that identifies the circuits, with the information being used to terminate a call. Such calls will be connected to a type 108 (T1) test line, such as test lines 58 and 60 of FIG. 3. Test lines 58 and 60 are operative to provide a wide band loopback. External test equipment, such as test equipment 50, that was used to originate a call will then be able to run end-to-end bit error rate testing (BERT). Additionally, fixed, floating, and flexible boundary selections will be supported.

The ATR functionality provided by ATR network 39 is concurrently provided using a "DMS-250" digital switching device which is a digital central office, or public exchange, that is manufactured by Nortel Communication, or Nortel Networks Corporation, of Brampton, Ontario, Canada. External test equipment 50 of FIG. 2 uses public telecommunications systems (PTS) along with dialed digits in order to directly select a terminating circuit via one of test lines 58 or 60. However, bit error rate testing, pursuant to prior art techniques, is limited to 56 Kbps wherein a known pattern of bits is transmitted, and errors are received and counted in order to figure a bit error rate (BER) for the tested circuit. Furthermore, wide band testing is not provided with prior art techniques.

As described above, ATR functionality according to one implementation is provided via a digital switch in the form "DMS-250" 52. External test equipment 50 utilizes public telecommunications systems (PTS) signaling, as well as dial digits, in order to directly select a terminating circuit. According to present prior art techniques, bit error rate test (BERT) testing is presently limited to 56 Kbps, and wide band is not presently provided pursuant to such prior art techniques.

According to FIG. 3, test equipment 50 comprises external test equipment that enables the implementation of automated test routing (ATR) functionality. Test equipment 50 is configured to interface with "DMS-250" 52 via PRI interface 40. Test equipment 50, when implemented as external test equipment, is used to generate a call, then run a bit error rate test (BERT) over a connection that is formed as a consequence thereof between test equipment 50 and switch 26, with switch 26 comprising "DMS-250" 52. Additionally, in order to enable wide band direct select functionality, an information element (IE) is provided by the PRI SETUP message.

The provision of wide band automated test routing (ATR) component functionality of FIG. 3 provides an ability to originate a wide band test call from an external test box that is connected to "DMS-250" 52 by way of an interface, such as ISDN PRI 40. In order to implement such feature, a code set 6 information element (IE) is added to the above-described SETUP message. Such code set 6 IE contains terminating circuit information. Accordingly, such information makes it possible to terminate a call to circuits using fixed, flexible, or floating boundary selection. Moreover, termination will be possible with calls to circuits that are using either INSV or MANB pursuant to the technical specification requirements for "DMS-250" 52. Additionally, an automated test routing (ATR) trunk group parameter is added to the primary rate interface, and is used to enable wide band direct select capabilities. For the case of originating call processing, call processing is modified at the originating port in order to read the TCID information element (IE) in the SETUP message. After reading, the information is then sent to the CM. Verification is then made that the information transfer rate specified in the bearer capability is consistent with information that is provided in the slot map of the TCID information (IE).

For the case where it is desired to terminate call processing, information in the TCID parameter is used to select the terminating circuits. If a call is terminated at domestic PTS agencies and BERT, or testing, as specified, then only a 56 Kbps data rate is supported. For the case of domestic ISUP and PRI, ETSI PRI and ITU ISUP terminations, 64 Kbps testing will be supported. For the case of terminations to ISUP IMT, ISUP FGD, and domestic PRI terminations, wide band data testing is also supported. For the case of all terminations, the ability to terminate calls is provided where ports are NSV or MANB.

The provision of automated test routing (ATR) functionality is enabled by a ATR trunk group parameter which is added to each of the domestic PRI trunks. In operation, normal translations and routing of calls will be bypassed for PRI trunks where the ATR trunk group parameter is set. For such cases, a call will be routed based on the terminating channel identification information element (IE) provided in the SETUP message.

Figure 4:
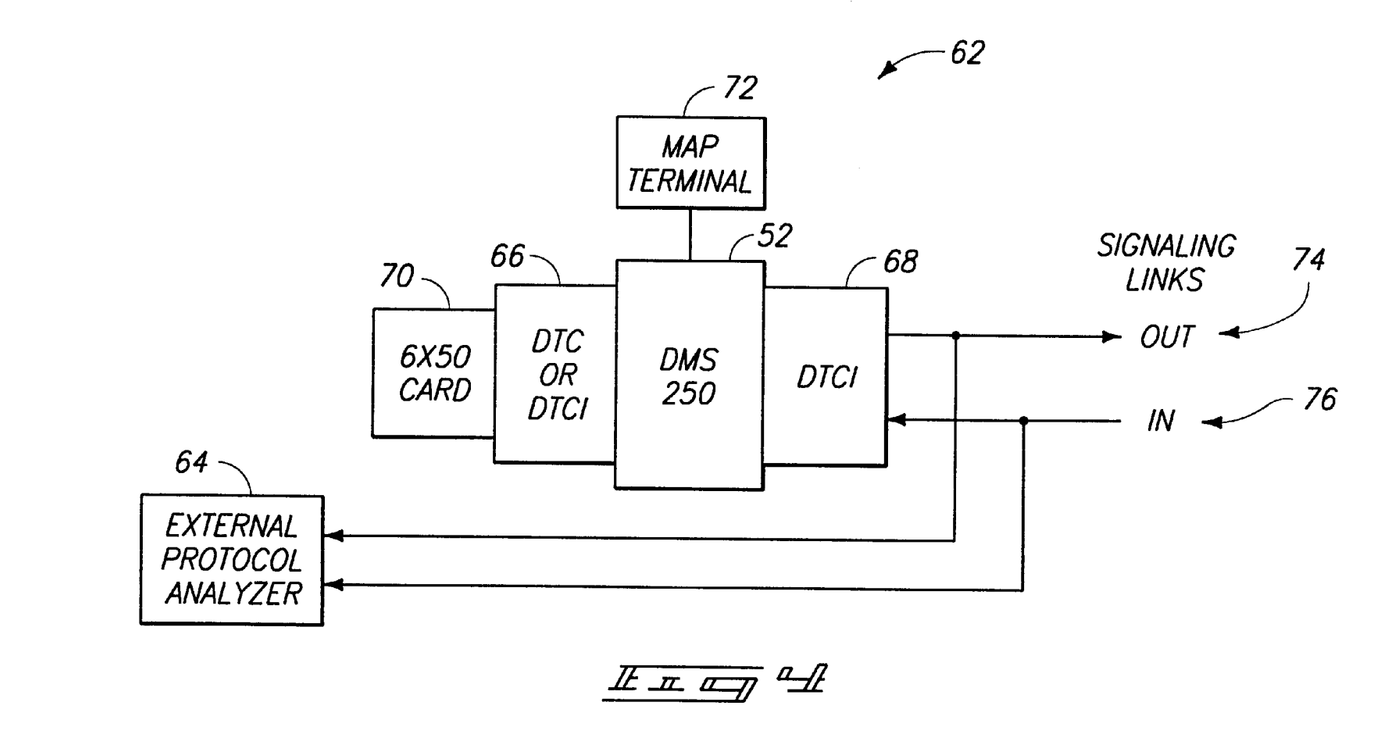
FIG. 4 is a block diagram illustrating a primary rate interface (PRI) digital test access (DTA) schematic block diagram.

FIG. 4 is a block diagram of primary rate interface (PRI) digital test access (DTA) 62 which illustrates how DTA 62 is used in the system 10 of FIG. 2. More particularly, PRI DTA 62 includes an external protocol analyzer 64, a DTC (or DTCI) 66, a DTCI 68, a 6X50 70, and a MAP terminal 72. A pair of signaling, or logical, links are provided in the form of "out" link 74 and "in" link 76. A connection between the signaling links 74 and 76 which are being monitored, and the DTA port is established using map commands via a maintenance and administration panel (MAP) 72. MAP 72 comprises a terminal device that is attached to a PBX or switch and which allows a user to maintain and administer a system in order to change phone features, etc. PRI signaling links 74 and 76 are delivered to a T1 interface which can then be connected to an external protocol analyzer that is capable of monitoring the D channel of a PRI interface, such as PRI interface 40 of FIG. 2.

DTA 62 provides the ability to connect external test equipment 50 to a central location such as a network test center 48 (see FIG. 3). MAP commands from MAP terminal 72 can then be used to establish a desired connection (see FIG. 4). This combination provides the ability to more rapidly and reliably monitor suspect signaling links.

In operation, digital test access (DTA) provides an ability to monitor signaling on a D channel of either a domestic primary rate interface (PRI) trunk, such as trunks 34 and 35 of FIG. 2. A connection formed between the signaling links 74 and 76 that are being monitored and a DTA port will be established using MAP commands provided by MAP terminal 72. PRI signaling links 74 and 76 are brought out to a T1 interface, which can then be connected to an external protocol analyzer that is capable of monitoring the D channel of the PRI interface. One such interface is provided by PRI interface 40 (of FIG. 3).

As shown in FIG. 4, test equipment 50 is provided in order to realize digital test access (DTA) functionality. Test equipment 50 interfaces with switch 26, herein "DMS-250" 52, via a T1 span, or PRI link, 40.

As shown in FIG. 4, primary rate interface (PRI) digital test access (DTA) circuitry 62 provides an ability to monitor primary rate interface D (PRI D) channels. Accordingly, a capability is provided to monitor the D channel on either a T1 or E1 span, wherein the span refers to a portion of a high-speed digital system that connects a central office to a central office, or a terminal office to a terminal office. Selection of such channel in order to conduct monitoring is accomplished via MAP commands provided via MAP terminal 72 of FIG. 4. Selected channels are connected via MAP commands to a circuit within a T1 carrier on a 6X50 card 70 for the case where the channel that is to be monitored is present on a T1 span. For the case where the channel to be monitored is provided on an E1 span, the channel that is used for monitoring is also provided on the E1 span. An external protocol analyzer is then connected to either the T1 span or the E1 span, and the desired channel is selected for monitoring. 6X50 card 70 of FIG. 4 can reside either on DTC 66, or DTCI 66 or 68. As shown in FIG. 4, reference numeral 66 in one form is a DTC and in another form is a DTCI. When monitoring on an E1 span, such monitoring can be either on a DTCO or a DTCOI.

Accordingly, an ability is provided to monitor PRI D channels, and specific connections are established in order to monitor a duplex signaling link. The digital test access (DTA) functionality is controlled by the MAP interface provided by MAP terminal 72 of FIG. 4.

The utilization of switch software 53 within test set 38 (of FIG. 2) is realized in combination with custom ISDN information elements which are described below in greater detail according to exemplary implementation. One custom, or new, terminating channel identification information element (IE) which is usable by an ATR component with Applicant's test system is described below for utilization with a Nortel digital switch, such as "DMS-250" 52 (of FIG. 3).

Direction: (U→RN) only
IE|Coding: Hex 398
Message: SETUP
Code Set: 6
Type: Optional
Length: 2-n The purpose for providing the terminating channel identification information elements (IE) is to identify channels on the terminating interface. One exemplary identification is described below in Table 1.

TABLE 1

| Octets | 8 | 7 | 6 | 5 | 4 | 3 | 2 | 1 |
|---|---|---|---|---|---|---|---|---|
| | | | Terminating Channel IDentification IE | | | | | |
| 1 | 0 | 0 | 1 | 1 | 1 | 0 | 0 | 0 |
| 2 | Length of terminating channel identification contents | | | | | | | |
| 3 | 1 Ext. | Spare | | Num b/Map | | PM Type Identifier | | |
| 4 | 1 xt. | Channel Type/ Map Element Type | | | | ength of PM Number Field | | |
| 5 | PM Number Low (bits 8-1) | | | | | | | |
| 6 | PM Number High (bits 11-9) | | | | | | | |
| 7 | 1 xt. | Span Number | | | | | | |
| 8 | Circuit Number/Slot map | | | | | | | |

Figure 5:
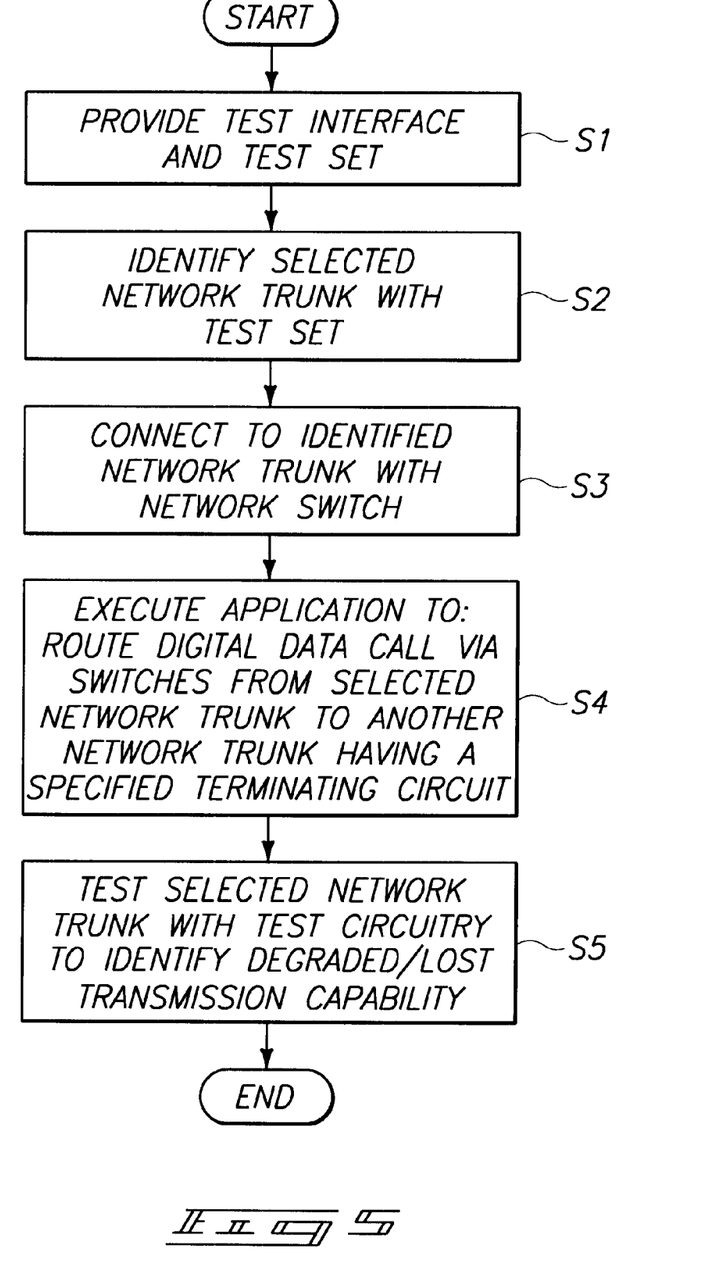
FIG. 5 is a logic flow diagram illustrating the steps involved in implementing Applicant's invention.

FIG. 5 discloses a first level logic flow diagram for the programming of processing circuitry within the test set of FIG. 2. The logic flow diagram describes a process that includes logical operations that are implemented by the switching software within the test set. Furthermore, the logical flow diagram includes steps utilized according to one implementation of Applicant's invention.

In Step "S1", a test interface and a test set are provided. The test set includes test circuitry, processing circuitry, memory and a switching application program that is operative to route digital data calls over a network. After performing Step "S1", the process proceeds to Step "S2".

In Step "S2", the process identifies the selected network trunk via the test set. After performing Step "S2", the process proceeds to Step "S3".

In Step "S3", the process selectively connects to the selected network trunk with an associated network switch via the test interface. After performing Step "S3", the process proceeds to Step "S4".

In Step "S4", the process executes the application program in order to route a digital data call via the switches from the selected network trunk to a terminating circuit on another network trunk in order to transfer the digital data call over to the another network trunk where the call is delivered to the another network trunk. After performing Step "S4", the process proceeds to Step "S5".

In Step "S5", the process tests the selected network trunk with the test circuitry to identify any degraded/lost capability to transmit digital data over the selected network trunk. After performing Step "S5", the process terminates.

The protection sought is not to be limited to the disclosed embodiments, which are given by way of example only, but instead is to be limited only by the scope of the appended claims as properly interpreted in accordance with the doctrine of equivalents.

What is claimed is:

1. A test system for use with a communications network having a plurality of switches and trunks, comprising:
   test circuitry operative to test the transmission of digital data over a selected network trunk;
   a test interface communicating with the test circuitry and operative to connect the test circuitry with the selected network trunk;
   a test set communicating with the test circuitry and the test interface and operative to selectively connect to the network switches via the test interface, the test set including processing circuitry, memory and a switching application program;
   wherein the processor executes the application program to route a digital data call via a switch from the selected network trunk to another network trunk, and specify a terminating circuit used to terminate the digital data call via the switch where the call is thereafter delivered, and wherein the test circuitry implements testing of the selected trunk.

2. The test system of claim 1 wherein the test interface is a primary rate interface (PRI).

3. The test system of claim 1 wherein the test set further comprises an integrated services digital network (ISDN) information element that is operative to route a call to another switch and terminate a digital data call over a specific trunk where the call is terminated at a standard test line.

4. The test system of claim 1 wherein the test interface implements integrated services digital network (ISDN) T1 primary rate interface (PRI) access between the test set and a digital switch capable of supporting ISDN services.

5. The test system of claim 1 further comprising a digital switch communicating with the test interface, wherein the test set operatively connects via the digital switch with the selected network trunk, and wherein the test circuitry is enabled by the switching application program to test the selected trunk.

6. The test system of claim 1 wherein the test circuitry comprises test equipment provided within the test set.

7. The test system of claim 1 further comprising a user interface communicating with the test set and operative to access a selected network trunk via the test set by a user.

8. The test system of claim 7 wherein the user interface comprises an automated test routing (ATR) device configured to automatically perform testing of digital data calls over a selected network trunk via the test system.

9. The test system of claim 7 wherein the user interface comprises a local tester.

10. The test system of claim 7 wherein the user interface comprises a remote tester.

11. The test system of claim 1 wherein the terminating circuit comprises a test line.

12. An apparatus for testing digital data transfer within a communications network having a plurality of switches and trunks, comprising:
   an interface configured to couple with a selected network trunk; and
   a test set including test circuitry, processing circuitry, memory and a switching application program, the test circuitry configured to test digital data transmission over the selected network trunk, the test set operative to selectively connect with the network switches via the test interface;

wherein the processor executes the application program to transfer a digital data call with a switch from the selected network trunk to another network trunk having a terminating circuit used to terminate the digital data call via the switch where the call is thereafter delivered, and wherein the test circuitry implements testing of the selected trunk.

13. The apparatus of claim 12 wherein the test circuitry comprises test equipment.

14. The apparatus of claim 13 further comprising a network test center communicating with the test equipment.

15. The apparatus of claim 12 wherein the selected switch comprises a digital switch, wherein the test circuitry is provided by digital test equipment, and further comprising a primary rate interface (PRI) coupled between the test equipment and the digital switch.

16. A method of testing network trunks within a network having a plurality of switches and trunks comprising:

providing a test interface and a test set, the test set including test circuitry, processing circuitry, memory and a switching application program operative to route digital data calls over the network;

identifying a selected network trunk via the test set;

selectively connecting to the selected network trunk with an associated network switch via the test interface;

executing the application program to route a digital data call via the switches from the selected network trunk to a terminating circuit on another network trunk to transfer the digital data call over to the another network trunk where the call is delivered to the another network trunk; and testing the selected network trunk with the test circuitry to identify a degraded capability to transmit digital data over the selected network trunk.

17. The method of claim 16 wherein the test interface is a primary rate interface (PRI).

18. The method of claim 16 further comprising providing a user interface communicating with the test set, wherein the step of executing the application program comprises accessing the user interface to enable the application program and route a digital data call from the selected trunk network to another trunk network, and to test the selected trunk network with the test set.

19. The method of claim 18 wherein the user interface comprises an automated test routining (ATR) device.

20. The method of claim 18 wherein the user interface comprises a local tester.

21. The method of claim 18 wherein the user interface comprises a remote tester.

22. The method of claim 16 wherein the test set further includes test circuitry operative to test the transmission of digital data over a selected network trunk.

* * * * *